(12) United States Patent
Mullen et al.

(10) Patent No.: US 8,981,884 B2
(45) Date of Patent: Mar. 17, 2015

(54) HALL EFFECT GRAIN LEVEL SWITCH

(71) Applicant: CTB, Inc., Milford, IN (US)

(72) Inventors: Brandon Stephen Mullen, Lebanon, IN (US); Brent J. Bloemendaal, Zionsville, IN (US)

(73) Assignee: CTB, Inc., Milford, IN (US)

( * ) Notice: Subject to any disclaimer, the term of this patent is extended or adjusted under 35 U.S.C. 154(b) by 92 days.

(21) Appl. No.: 13/791,916

(22) Filed: Mar. 9, 2013

(65) Prior Publication Data

US 2014/0251497 A1 Sep. 11, 2014

(51) Int. Cl.
H01H 9/00 (2006.01)
H01H 50/02 (2006.01)
B65B 1/48 (2006.01)
A01D 41/127 (2006.01)

(52) U.S. Cl.
CPC ............... *H01H 50/02* (2013.01); *B65B 1/48* (2013.01); *A01D 41/1275* (2013.01)
USPC .......................................... 335/205

(58) Field of Classification Search
USPC ................ 335/205–207; 200/81.9 M, 84 C; 338/32 H, 32 R
See application file for complete search history.

(56) References Cited

U.S. PATENT DOCUMENTS

| 3,349,203 | A | * | 10/1967 | Wolford | 200/83 R |
| 3,368,173 | A | * | 2/1968 | Wolford | 335/207 |
| 3,721,179 | A | * | 3/1973 | Applegate | 99/487 |
| 3,736,667 | A | * | 6/1973 | McClaren | 34/551 |
| 4,152,840 | A | * | 5/1979 | Stille | 34/575 |
| 4,352,623 | A | * | 10/1982 | Smiley | 414/294 |
| 4,715,302 | A | * | 12/1987 | Briggs | 111/173 |

OTHER PUBLICATIONS

Allegro MicroSystems, Inc.; Continuous-Time Switch Family A110x Datasheet; Revised May 29, 2012.

* cited by examiner

*Primary Examiner* — Ramon Barrera
(74) *Attorney, Agent, or Firm* — Harness, Dickey

(57) ABSTRACT

A Hall effect grain level switch is positioned adjacent a grain fill opening at an upper portion of a grain enclosure. A Hall-voltage generator is coupled to the housing in a fixed position. An elongate member is pivotably coupled to the housing with the magnet being mounted adjacent a proximal end of the elongate member. A grain contact member is coupled adjacent a distal end of the elongate member. The Hall-voltage generator and magnet are positioned adjacent each other to provide a first output signal state when the elongate member extends vertically in a rest position. The Hall-voltage generator and magnet are distanced from each other to provide a second output signal state when the elongate member is pivoted to a non-vertical switched position in response to grain moving the contact member.

20 Claims, 5 Drawing Sheets

HALL EFFECT GRAIN LEVEL SWITCH

FIELD

The present disclosure relates to a grain level switch and to grain enclosures, such as grain dryers and grain storage bins, with such switches.

BACKGROUND

This section provides background information related to the present disclosure which is not necessarily prior art.

One type of grain level switch involves the use of a mercury electrical contact switch. Such a switch is typically coupled at one end of a horizontally extending rotatable or pivotable rod. A paddle extends from the horizontal rod to rotate or pivot the rod when it is contacted by grain. There are environmental problems associated with the use and disposal of mercury electrical contact switches. Another disadvantage with such arrangements is that the switch is only responsive to a component of grain flow that is moving perpendicular to the paddle.

Another type of grain level switch uses a rotating paddle coupled to a motor via a slip clutch. When grain surrounds the rotating paddle causing the clutch to begin to slip, a corresponding grain level is sensed. Turning the motor in order to detect whether grain is present, however, uses electricity unnecessarily, creating a different set of environmental issues. Other disadvantages include high component and maintenance costs, and an undesirable time lag between grain reaching the level of the rotating paddle and the clutch beginning to slip.

Yet another type of grain level switch uses a capacitive sensor. When grain is present adjacent the capacitor, the capacitance reading changes (as compared with air being adjacent the capacitive sensor) resulting in a corresponding signal. Such capacitive sensors can give false readings when the temperature is low or condensation occurs on the sensor.

Thus, it is desirable to provide an improved grain level switch.

SUMMARY

This section provides a general summary of the disclosure, and is not a comprehensive disclosure of its full scope or all of its features.

In accordance with one aspect of the present disclosure a Hall effect grain level switch is provided. A housing encloses a Hall-voltage generator and a magnet. One of the Hall-voltage generator and the magnet is coupled to the housing in a fixed position within the housing. An elongate member is pivotably coupled to the housing with the other one of the Hall-voltage generator and the magnet being mounted adjacent a proximal end of the elongate member. A grain contact member is coupled to the elongate member adjacent a distal end of the elongate member. The elongate member is configured to have a rest position indicative of grain not impinging upon the grain contact member, and in which the Hall-voltage generator and magnet are positioned adjacent each other to provide a first output signal state. The elongate member is configured to be pivoted to a switched position indicative of a grain level reaching the grain contact member, and in which the Hall-voltage generator and magnet are distanced from each other to provide a second output signal state.

In accordance with another aspect of the present disclosure, a grain enclosure and Hall effect grain level switch combination is provided. A grain fill opening is positioned at an upper portion of the grain enclosure. A housing is positioned adjacent the grain fill opening. The housing encloses a Hall-voltage generator and a magnet. One of the Hall-voltage generator and the magnet is coupled to the housing in a fixed position within the housing. An elongate member is pivotably coupled to the housing with the other one of the Hall-voltage generator and the magnet being mounted adjacent a proximal end of the elongate member. A grain contact member is coupled to the elongate member adjacent a distal end of the elongate member. The Hall-voltage generator and magnet are positioned adjacent each other to provide a first output signal state when the elongate member is in a rest position in which grain is not impinging upon the grain contact member. The Hall-voltage generator and magnet are distanced from each other to provide a second output signal state when the elongate member is pivoted to a switched position in response to grain contacting against the contact member indicative of a grain level within the grain enclosure reaching the grain contact member.

In accordance with yet another aspect of the present disclosure a grain enclosure and Hall effect grain level switch combination is provided. A grain fill opening is positioned at an upper portion of the grain enclosure. A housing is positioned adjacent the grain fill opening. The housing encloses a Hall-voltage generator and a magnet. The Hall-voltage generator is coupled to the housing in a fixed position within the housing. An elongate member is pivotably coupled to the housing with the magnet being mounted adjacent a proximal end of the elongate member. A grain contact member is coupled to the elongate member adjacent a distal end of the elongate member. The Hall-voltage generator and magnet are positioned adjacent each other to provide a first output signal state when the elongate member extends vertically in a rest position in which grain is not impinging upon the grain contact member. The Hall-voltage generator and magnet are distanced from each other to provide a second output signal state when the elongate member is pivoted to a non-vertical switched position in response to grain contacting against the contact member indicative of a grain level within the grain enclosure reaching the grain contact member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 2:
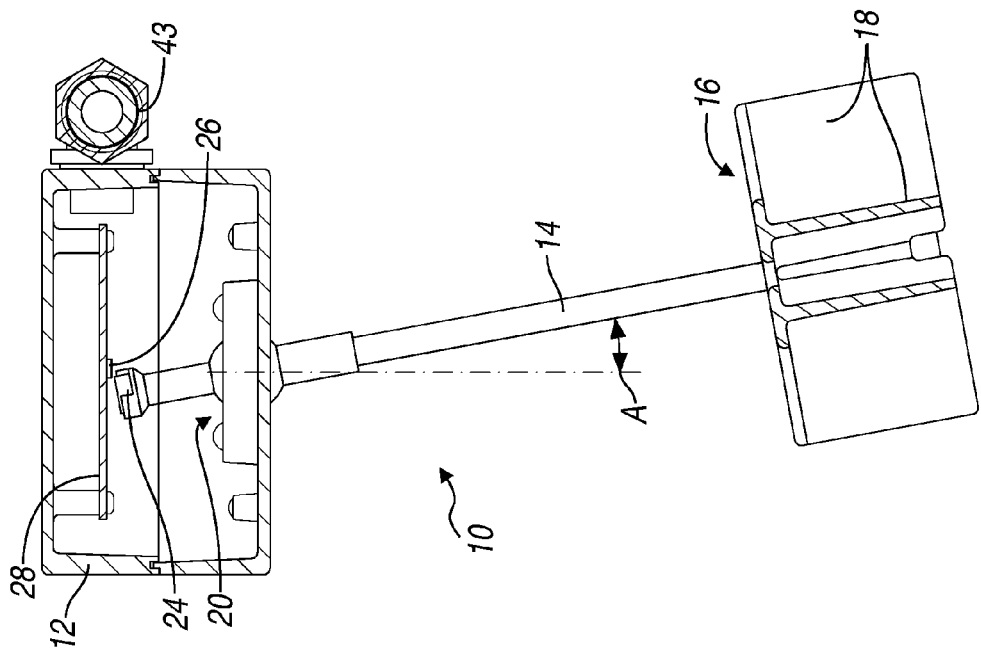
FIG. 2 is a cross-sectional view of the Hall effect grain level switch of FIG. 1.
Figure 1:
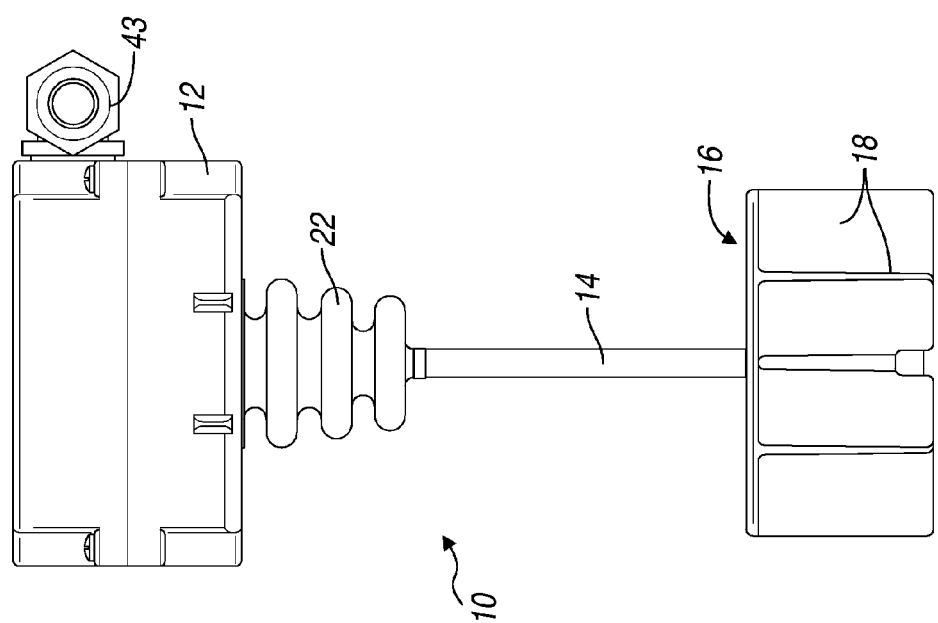
FIG. 1 is a side elevation view of an example of a Hall effect grain level switch in accordance with the present disclosure.
Figure 3:
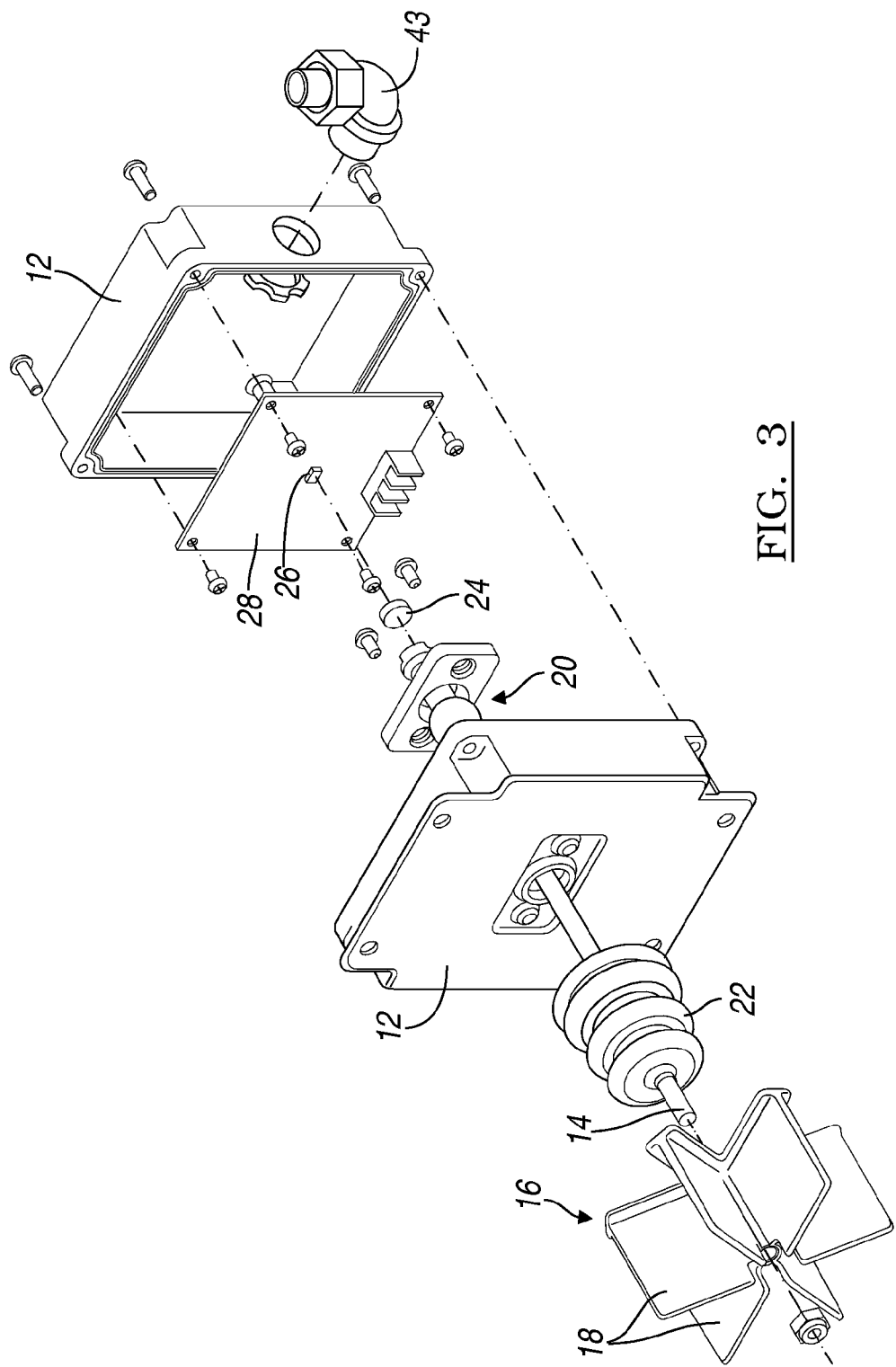
FIG. 3 is an exploded view of the Hall effect grain level switch of FIG. 1.
Figure 4:
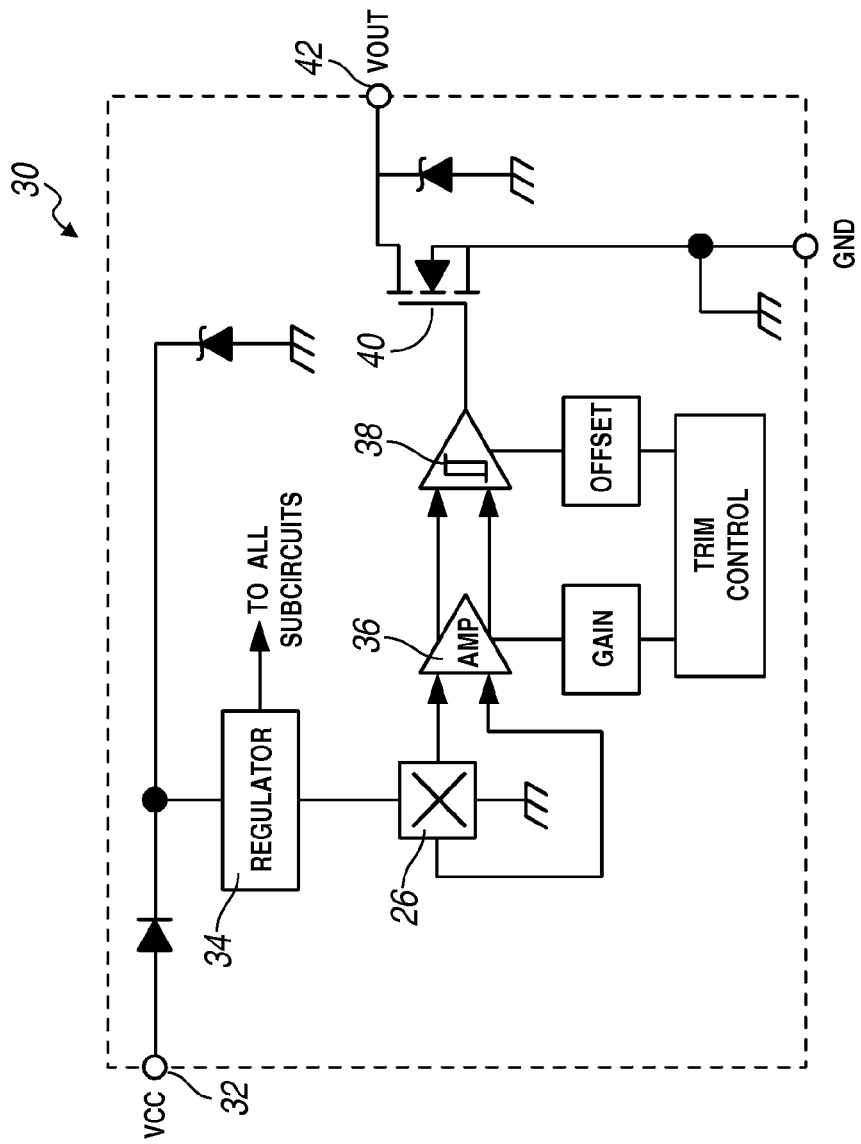
FIG. 4 is a functional block diagram of an example of a Hall effect grain level switch circuit for the switch of FIG. 1.

Example embodiments will now be described more fully with reference to the accompanying drawings.

Referring to FIGS. 1-4, a Hall effect grain level switch 10 generally includes a housing 12, and an elongate pivot member or arm 14. A grain contact member 16 is coupled to elongate member 14 adjacent a distal end of the elongate member 14. Grain contact member 16 includes a plurality of vanes 18 extending radially from and generally parallel to the central axis of elongate member 14. In this case, six equally spaced vanes 18 are provided. In some cases, at least three equally spaced vanes 18 can be provided. It should be appreciated that such multiple vanes 18 makes the grain contact member 16 more responsive to various potential grain flow impingement directions.

Elongate member 14 is coupled to housing 12 via a ball joint coupling 20. Such a ball joint coupling 20 can permit pivot arm to pivot in any direction (360 degrees), which also makes switch 10 completely responsive to various potential grain flow directions, regardless of the flow direction. Thus, switch 10 is capable of operating as intended even if unpredictable grain flow patterns impinge upon grain contact member 16. A rubber sealing boot 22 can be provided to protect the ball joint coupling 20 from dirt and particles such as grain fines.

A magnet 24 can be coupled adjacent a proximal end of elongate member 14. In this case, magnet 24 is a disk magnet positioned at the proximal end of elongate member 14 such that the central axis of magnet 24 is aligned with the central axis of elongate member 14.

A Hall-voltage generator 26 can be coupled to housing 12 in a fixed position. For example, Hall-voltage generator 26 can be mounted on a side of a planar member 28 facing magnet 24. The Hall-voltage generator 26 can be part of a switch circuit 30. Thus, planar member 28 can be a circuit board incorporating switch circuit 30 with Hall-voltage generator 26. As another alternative, planar member 28 can be a simple support member wherein an integrated circuit package incorporating switch circuit 30 with Hall-voltage generator 26.

Switch circuit 30 can generally include a supply voltage input line 32 coupled to Hall-voltage generator 26 via a voltage regulator 34. The output of Hall-voltage generator 26 is coupled to a Schmitt trigger 38 via a small-signal amplifier 36. The output of Schmitt trigger 38 is coupled to an NMOS output transistor 40 to provide an output signal voltage via line 42. Exemplary IC packages incorporating such Hall effect switch circuitry are commercially available in an integrated circuit package from Allegro Microsystems, Inc of Worcester, Mass., and sold under the trade name Allegro® and identified by numbers A1101-A1104 and A1106.

Elongate member 14 has a rest position in which magnet 24 and Hall-voltage generator 26 are positioned closely adjacent to each other allowing the magnetic field of magnet 24 to act on Hall-voltage generator 26. This position can be the position illustrated in FIG. 1. When disposed for use, the rest position can orient elongate member 14 vertically. As such, gravity will tend to bias elongate member 14 into the rest position. The presence of magnet 24 in such close proximity to Hall-voltage generator 26, when elongate member 14 is in the rest position, results in switch circuit 30 providing an output signal in a first output state via output line 42.

Elongate member 14 can also be pivoted into a switched position the Hall-voltage generator 26 and magnet 24 are distanced from each other resulting in switch circuit 30 providing the output signal in a second output signal state. The first and second signal output states can be zero and a voltage value, respectively. Alternatively, the first and second signal output states can be relatively low voltage value and a relatively high voltage value, respectively.

One such switched position is illustrated in FIG. 2. As should be appreciated, grain flows can be unpredictable, but the switch of FIG. 1 will respond to grain flow regardless of the direction of the flow of grain. In addition, it should be appreciated that a relative small angular movement of elongate member 14 can move elongate member 14 from the rest position to the switched position. For example, in some cases, there can be between about 5 degrees and about 15 degrees of pivotal movement between the rest and switched positions (e.g., angle A in FIG. 2). In other cases, there is about 10 degrees of pivotal movement between the rest and switched positions. Thus, any delay between grain first impinging against grain contact member 16 and reaching the switched position is reduced while avoiding false tripping of switch 10 due, for example, to vibrations.

Figure 5:
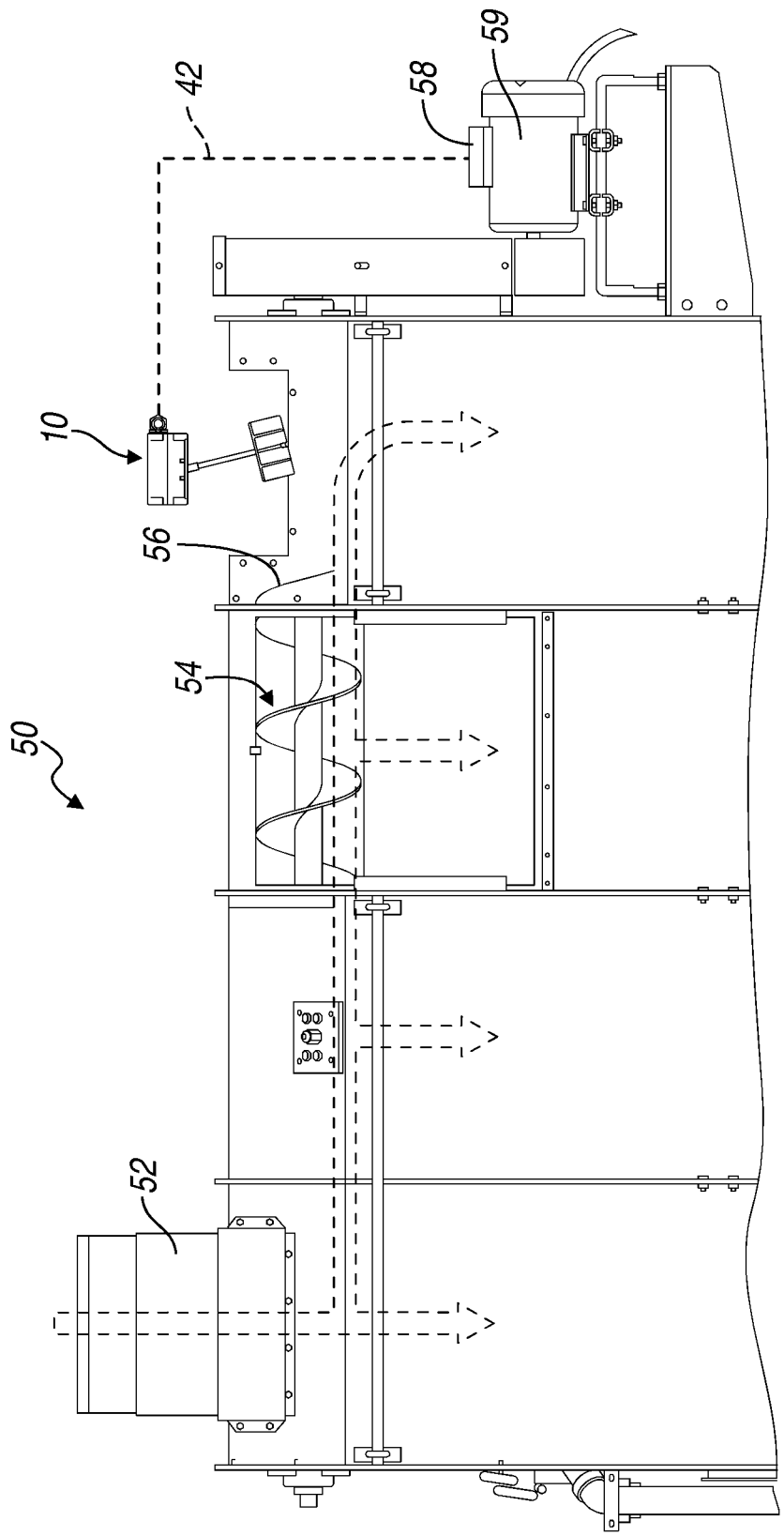
FIG. 5 is a partial diagrammatic side view of an example of a grain drier enclosure and Hall effect grain level switch combination in accordance with the present disclosure.

With additional reference to FIG. 5, a gain enclosure 50 and Hall effect grain level switch 10 combination is illustrated. This grain enclosure 50 is a grain dryer. Grain is fed to grain dryer 50 via hopper 52. A leveling auger 54 operates as a grain filling apparatus. Auger 54 operates to transport grain horizontally (over ever-increasing horizontal distances) as grain dryer 50 is filled. It will be appreciated that the last portion of grain enclosure 50 to fill is in the area adjacent a distal end 56 of auger 54. The grain flow fill path is indicated by arrows in FIG. 5.

Hall effect grain level switch 10 can be positioned at the upper portion of grain enclosure 50 adjacent this last to fill area. As such, when grain flows into this area it impinges against grain contact member 16 and moves elongate member 14 into the switched position (as illustrated in FIG. 5). When this occurs the corresponding switched output signal is communicated from switch 10 to a controller 58 via output line 42 which can pass through coupling 43. This switched output signal notifies controller 58 to turn off auger 54.

As grain is processed through grain dryer 50, the level of grain within grain dryer 50 falls. Thus, grain moves away from grain contact member 16 allowing elongate member to move back into a vertical orientation under the biasing force of gravity. This vertical orientation corresponds to the rest position of elongate member 14. At some point after elongate member 14 returns to its rest position, auger 54 can again be turned on and switch 10 will, at the appropriate time, again send a full indicator signal value to controller 58 causing controller to turn off motor 59 to auger 54.

Figure 6:
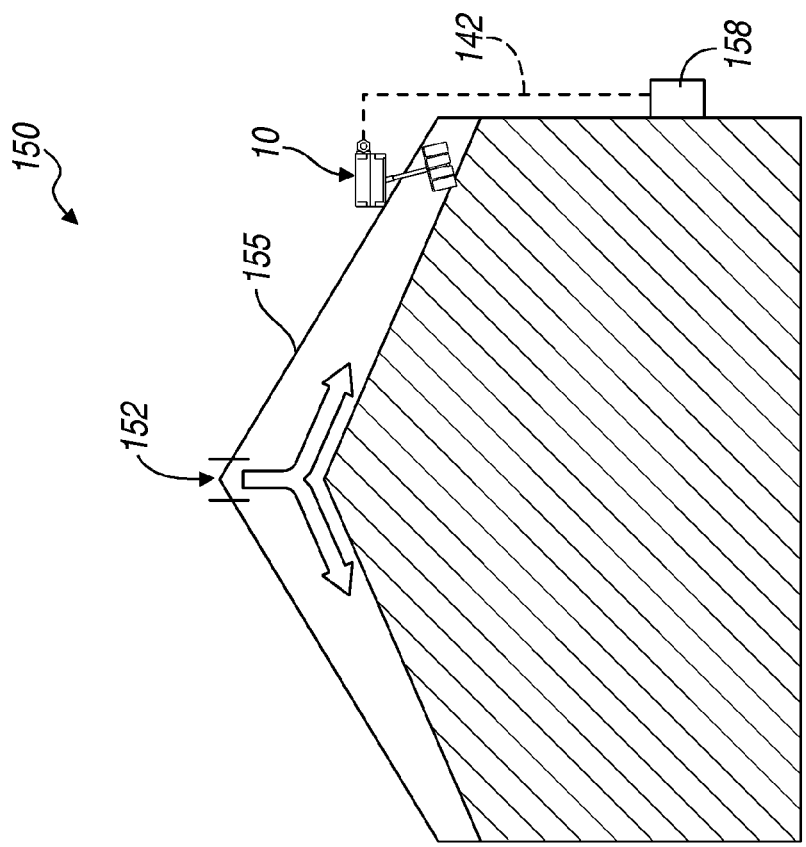
FIG. 6 is a diagrammatic side view of an example of a grain bin enclosure and Hall effect grain level switch combination in accordance with the present disclosure.

With additional reference to FIG. 6, another grain enclosure 150 and Hall effect grain level switch 10 combination is illustrated. This grain enclosure 150 is a grain storage bin. Grain is fed into storage bin 150 via an opening 152. Grain has an angle of repose that can result in a conical upper surface creating in a full grain flow that is generally represented by arrows in FIG. 6. A grain auger or other grain fill apparatus (not seen in FIG. 6, but somewhat similar to auger 54 of FIG. 5) can be used to transport and dispense grain into grain fill opening 152 through the roof 155 of grain bin 150.

Hall effect grain level switch 10 can also be coupled to roof 155 at an upper portion of grain bin 150 so that elongate member 14 extends vertically into grain bin 150 in the rest position. As grain bin 150 reaches full capacity, grain flow contacts impinges against grain contact member 16 and moves elongate member 14 into the switched position (as illustrated in FIG. 6). When this occurs the corresponding switched output signal is communicated from switch 10 to a controller 158 via output line 142. This switched output signal notifies controller 158 to turn off the grain fill equipment (e.g., a transport auger similar to auger 54 of FIG. 5). After a quantity of grain has been removed from the bin 150 the process can be repeated.

Figure 7:
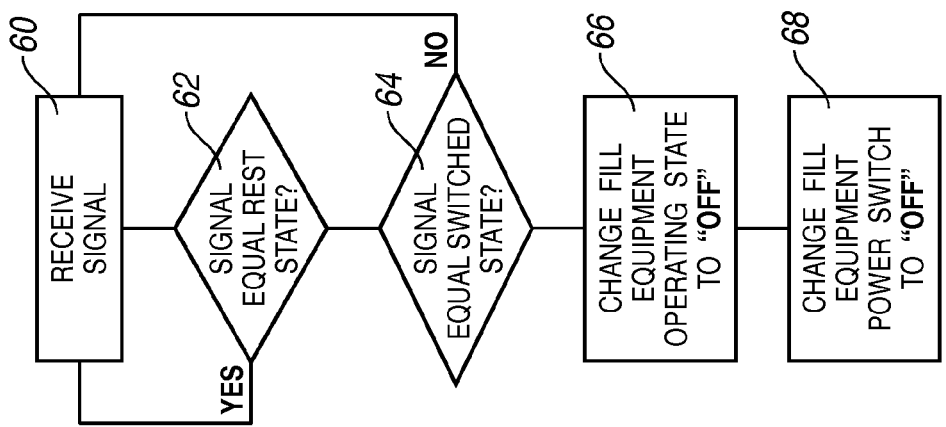
FIG. 7 is a logic flow diagram for a controller of a grain bin coupled to a hall effect grain level switch in accordance with the present disclosure.

With additional reference to FIG. 7, an example logic flow diagram illustrating for controllers 58, 158 is illustrated. Thus, controller 58, 158 can be configured to operate using some or all of the illustrated steps. Output signal is received from switch 10 at box 60. The signal is measured to determine whether its value or state corresponds to a rest state value at box 62. If so, the logic flow returns to box 60. If not, then the logic proceeds to box 64.

At box 64, switch output signal is measured to determine whether its value or state corresponds to a switched state. If not, the logic flow returns to box 60. If so, then the logic proceeds to box 66.

At box 66, controller 58, 158 changes the operating state stored in the controller to "off," which separately or simultaneously changes the fill equipment power switch state to "off" or sends an "off" signal to the fill equipment causing it to turn off at box 68. It will be appreciated that additional or fewer steps may be provided. For example, a serviceable configuration of controller 58, 158 may simply include boxes 64 and 68.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. As but one example, alternative configurations of grain contact member 16 can include a hollow spherical float-type member, or curved members, perhaps evoking a shovel-type shape. In some example embodiments, well-known processes, well-known device structures, and well-known technologies are not described in detail.

Although the terms first, second, third, etc. may be used herein, these terms may be only used to distinguish one component, state, or portion from another. Terms such as "first," "second," and other numerical terms when used herein do not imply a sequence or order unless clearly indicated by the context. Thus, a first element, component, region, layer or section discussed below could be termed a second component, state, or portion without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A Hall effect grain level switch comprising:
    a housing enclosing a Hall-voltage generator and a magnet, one of the Hall-voltage generator and the magnet coupled to the housing in a fixed position within the housing;
    an elongate member pivotably coupled to the housing with an other one of the Hall-voltage generator and the magnet being mounted adjacent a proximal end of the elongate member;
    a grain contact member coupled to the elongate member adjacent a distal end of the elongate member;
    wherein the elongate member is configured to have a rest position indicative of grain not impinging upon the grain contact member, and in which the Hall-voltage generator and magnet are positioned adjacent each other to provide a first output signal state; and
    wherein the elongate member is configured to be pivoted to a switched position indicative of a grain level reaching the grain contact member, and in which the Hall-voltage generator and magnet are distanced from each other to provide a second output signal state.

2. The Hall effect grain level switch of claim 1, wherein the Hall-voltage generator is coupled to the housing in the fixed position, and the magnet is mounted adjacent a proximal end of the elongate member.

3. The Hall effect grain level switch of claim 1, wherein the housing is configured to be coupled to the enclosure in an orientation allowing the elongate member to extend vertically in the rest position.

4. The Hall effect grain level switch of claim 1, wherein a ball joint couples the elongate member to the housing.

5. The Hall effect grain level switch of claim 1, wherein the grain contact member comprises a plurality of vanes extending radially outwardly from the elongate member.

6. The Hall effect grain level switch of claim 1, wherein the elongate member pivots about 10 degrees or less between the rest position and the switched position.

7. A grain enclosure and Hall effect grain level switch combination comprising;
    a grain fill opening positioned at an upper portion of the grain enclosure;
    a housing positioned adjacent the grain fill opening, the housing enclosing a Hall-voltage generator and a magnet, one of the Hall-voltage generator and the magnet coupled to the housing in a fixed position within the housing;
    an elongate member pivotably coupled to the housing with an other one of the Hall-voltage generator and the magnet being mounted adjacent a proximal end of the elongate member;
    a grain contact member coupled to the elongate member adjacent a distal end of the elongate member;
    wherein the Hall-voltage generator and magnet are positioned adjacent each other to provide a first output signal state when the elongate member is in a rest position in which grain is not impinging upon the grain contact member; and
    wherein the Hall-voltage generator and magnet are distanced from each other to provide a second output signal state when the elongate member is pivoted to a switched position in response to grain contacting against the contact member indicative of a grain level within the grain enclosure reaching the grain contact member.

8. The grain enclosure and Hall effect grain level switch combination of claim 7, wherein the Hall-voltage generator is coupled to the housing in the fixed position, and the magnet is mounted adjacent a proximal end of the elongate member.

9. The grain enclosure and Hall effect grain level switch combination of claim 7, wherein the elongate member extends vertically in the rest position.

10. The grain enclosure and Hall effect grain level switch combination of claim 7, wherein a ball joint couples the elongate member to the housing.

11. The grain enclosure and Hall effect grain level switch combination of claim 7, wherein the grain contact member comprises at least three vanes extending radially outwardly from the elongate member.

12. The grain enclosure and Hall effect grain level switch combination of claim 7, wherein the elongate member pivots about 10 degrees or less between the rest position and the switched position.

13. The grain enclosure and Hall effect grain level switch combination claim 7, further comprising a controller in communication with the Hall effect grain level switch and a grain fill apparatus configured to deliver grain to the grain fill opening, wherein the controller is configured to stop the grain fill apparatus upon detecting the second output signal state of the Hall effect grain level switch.

14. The grain enclosure and Hall effect grain level switch combination of claim 7, wherein the grain enclosure is a grain dryer.

15. A grain enclosure and Hall effect grain level switch combination comprising;
    a grain fill opening positioned at an upper portion of the grain enclosure;
    a housing positioned adjacent the grain fill opening, the housing enclosing a Hall-voltage generator and a magnet, the Hall-voltage generator being coupled to the housing in a fixed position within the housing;
    an elongate member pivotably coupled to the housing with the magnet being mounted adjacent a proximal end of the elongate member;
    a grain contact member coupled to the elongate member adjacent a distal end of the elongate member;
    wherein the Hall-voltage generator and magnet are positioned adjacent each other to provide a first output signal state when the elongate member extends vertically in a rest position; and
    wherein the Hall-voltage generator and magnet are distanced from each other to provide a second output signal state when the elongate member is pivoted to a non-vertical switched position in response to grain contacting against the contact member indicative of a grain level within the grain enclosure reaching the grain contact member.

16. The grain enclosure and Hall effect grain level switch combination of claim 15, wherein a ball joint couples the elongate member to the housing.

17. The grain enclosure and Hall effect grain level switch combination of claim 15, wherein the grain contact member comprises at least three of vanes extending radially outwardly from the elongate member.

18. The grain enclosure and Hall effect grain level switch combination of claim 15, wherein the elongate member pivots about 10 degrees or less between the rest position and the switched position.

19. The grain enclosure and Hall effect grain level switch combination of claim 15, further comprising a controller in communication with the Hall effect grain level switch and a grain fill apparatus configured to deliver grain to the grain fill opening, wherein the controller is configured to stop the grain fill apparatus upon detecting the second output signal state of the Hall effect grain level switch; and wherein the grain enclosure is a grain bin.

20. The grain enclosure and Hall effect grain level switch combination of claim 15, further comprising a controller in communication with the Hall effect grain level switch and a grain fill apparatus configured to deliver grain to the grain fill opening, wherein the controller is configured to stop the grain fill apparatus upon detecting the second output signal state of the Hall effect grain level switch; and wherein the grain enclosure is a grain dryer.

* * * * *